United States Patent Office 3,812,127
Patented May 21, 1974

3,812,127
4-(QUINOLIN-4-YL)PIPERAZINE-1-CARBOXYLIC
ACID ESTERS
Timothy H. Cronin, Niantic, and Hans-Jurgen E. Hess,
Old Lyme, Conn., assignors to Pfizer Inc., New York,
N.Y.
No Drawing. Application Mar. 17, 1970, Ser. No. 20,381,
now Patent No. 3,702,849, dated Nov. 14, 1972, which
is a division of application Ser. No. 678,191, Oct. 26,
1967, now Patent No. 3,517,005, dated June 23, 1970,
which in turn is a continuation-in-part of abandoned
application Ser. No. 590,494, Oct. 31, 1966. Divided
and this application June 2, 1972, Ser. No. 259,113
Int. Cl. C07d 51/70
U.S. Cl. 260—268 BQ
3 Claims

ABSTRACT OF THE DISCLOSURE

Substituted 6,7 - dialkoxyquinazolines, 4-(6,7-dialkoxy-quinolin-4-yl)-piperazine-1-carboxylic acid, esters, and 1-amino-6,7-dialkoxyisoquinolines and their pharmaceutically-acceptable acid addition salts. Compounds manifest bronchodilator activity and anti-hypertensive response with minimal adverse effects upon administration to afflicted subjects.

CROSS REFERENCE TO RELATED APPLICATIONS

This application is a division of application Ser. No. 20,381, filed Mar. 17, 1970 and now U.S. Pat. No. 3,702,-849, issued Nov. 14, 1972, which in turn is a division of application Ser. No. 678,191, filed Oct. 26, 1967 and now U.S. Pat. No. 3,517,005, issued June 23, 1970, which in turn is a continuation-in-part of application Ser. No. 590,-494, filed Oct. 31, 1966 and now abandoned.

BACKGROUND OF THE INVENTION

This invention relates to certain novel organic nitrogen compounds, and more particularly, it is concerned with various new and useful organic heterocyclic nitrogen compounds which are valuable in alleviating bronchoconstriction in afflicted subjects and in reducing the blood pressure of hypertensive subjects.

Treatment of subjects suffering from bronchoconstriction or hypertension requires that the therapeutic agent effectively cause bronchodilation or lower the blood pressure of the treated subject at dosage levels which do not cause other undesirable effects in the subject. The compounds of this invention manifest bronchodilatory and/or hypotensive activity at dosage levels at which no adverse effects are manifested in the treated individual.

SUMMARY OF THE INVENTION

The compounds of this invention are those of the following formulae:

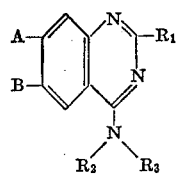

I and

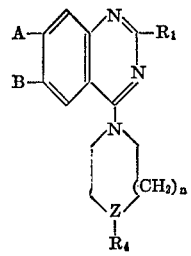

II and

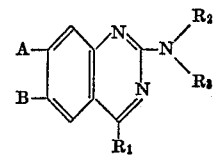

III and

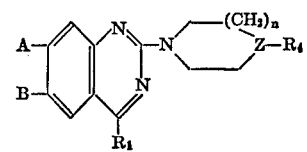

IV and

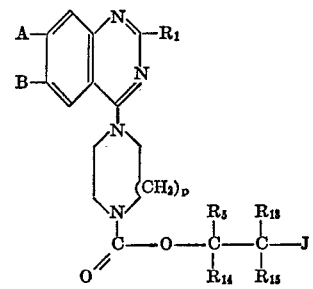

V and

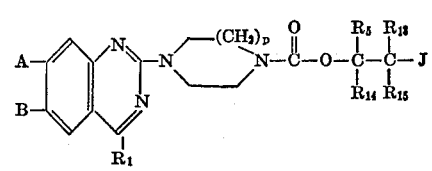

V(A)

and their pharmaceutically-acceptable acid addition salts.

In these compounds A and B may each be alkoxy containing from 1 to 5 carbon atoms, hydrogen, hydroxy, or methyl. When A or B are hydrogen, the other is never hydrogen and A and B, taken together, may be benzo or alkylenedioxy having up to 4 carbon atoms. $R_1$ may be H or alkyl containing from 1 to 6 carbon atoms. $R_2$ and $R_3$ may each be H, phenyl, phenylalkyl, alkyl, alkenyl, hydroxyalkyl or cycloalkyl, the alkyl, alkenyl and cycloalkyl moieties having up to 6 carbon atoms. Z is —$CH_2$—, O or N, provided that when Z is —$CH_2$— or O, $n$ is equal to one and when Z is N, $n$ is equal to one or two. $R_4$ may be H, alkyl, alkenyl, aryl hydrocarbon, alkylcarbonyl, aryloxycarbonyl, alkenyloxycarbonyl, benzoyl, naphthoyl or alkyloxycarbonyl, the alkyl and alkenyl moieties having up to 6 carbon atoms and the aryl hydrocarbon moiety having up to 10 carbon atoms. $R_5$, $R_{13}$, $R_{14}$ and $R_{15}$ may each be H, alkyl containing from 1 to 4 carbon atoms or hydroxymethyl. $R_5$ and $R_{13}$, taken together, may be cycloalkyl having from 4 to 7 carbon atoms. J may be H, hydroxy, formyloxy, acyloxy containing from 2 to 5 carbon atoms, aroyloxy containing up to 11 carbon atoms, alkoxy containing from 1 to 4 carbon atoms, aryloxy containing up to 10 carbon atoms, chloro, bromo, formamido, alkylamido having up to 4 carbon atoms in the alkyl group, arylamido having up to 10 carbon atoms in the aryl group, or amino, containing up to two substituents. Each amino substituent may be hydrogen, alkyl having up to 4 carbon atoms or aryl containing up to 10 carbon atoms, and the two substituents, taken together, may be cycloalkyl containing from 4 to 7 carbon atoms and $p$ may be one or two.

These compounds are useful as bronchodilators and as anti-hypertensive agents and are also useful in other manners.

The compounds which are particularly useful in effecting hypotensive action are those numbered I and III while compounds of all the depicted formulae exhibit useful bronchodilator activity. Compounds which are preferred as bronchodilators are the disclosed 6,7-dimethoxyquinazolines, the 6,7-ethylene dioxyquinazolines, the 6,7-di-iso-propoxyquinazolines as well as the 7-methoxyquinazolines. Of particular interest as bronchodilators are the compounds 4-amino-6,7-dimethoxyquinazoline, the compound 2-ethyl - 4 - amino-6,7-dimethoxyquinazoline, the compound 4-(6,7 - dimethoxyquinazolin-4-yl)-piperazine-1-carboxylic acid, isobutyl ester, the compound 4-(2-n-propyl-6,7-dimethoxyquinazolin-4-yl)-piperazine - 1 - carboxylic acid, isobutyl ester, the compound 4-(2-methyl-6,7-dimethoxyquinazolin-4-yl)-piperazine - 1 - carboxylic acid, isobutyl ester, the compound 4-(2-ethyl-6,7-dimethoxyquinazolin-4-yl)-piperazine - 1 - carboxylic acid, isobutyl ester, the compound 4-(6,7-dimethoxyquinazolin-4-yl)-piperazine-1-carboxylic acid, 2-methyl-2-hydroxypropyl ester, the compound 4-(6,7-dimethoxyquinazolin-4-yl)-piperazine-1-carboxylic acid, 2-methyl - 2 - propenyl ester, and the compound 4-(6,7-dimethoxyquinazolin-4-yl)-piperazine-1-carboxylic acid, 2-methyl-2-chloropropyl ester.

These compounds are also useful in effecting smooth muscle relaxation in subjects to which the compounds are administered.

Of particular interest as hypotensive agents are the compound 2-ethyl-4-amino-6,7-dimethoxyquinazoline, the compound 2 - methyl-4-amino-6,7-dimethoxyquinazoline, the compound 4-amino-6,7-dimethoxyquinazoline, and the compound 2-n-propyl-4-amino-6,7-dimethoxyquinazoline.

Other compounds of this invention are those of the formula:

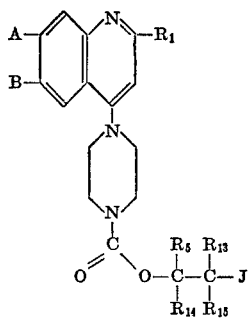

VI and their pharmaceutically-acceptable acid addition salts.

In these compounds of formula VI, A and B may each be alkoxy containing from 1 to 5 carbon atoms, hydrogen, hydroxy, or methyl. When A or B are hydrogen, the other is never hydrogen. A and B, taken together, may be benzo or alkylenedioxy having up to 4 carbon atoms. $R_1$ may be H or alkyl containing from 1 to 6 carbon atoms. $R_5$, $R_{13}$, $R_{14}$ and $R_{15}$ each may be H, alkyl containing from 1 to 4 carbon atoms or hydroxymethyl and $R_5$ and $R_{13}$, taken together, may be cycloalkyl having from 4 to 7 carbon atoms, J may be H, hydroxy, formyloxy, acyloxy containing from 2 to 5 carbon atoms, aroyloxy containing up to 11 carbon atoms, alkoxy containing from 1 to 4 carbon atoms, aryloxy containing up to 10 carbon atoms, chloro, bromo, formamido, alkylamido having up to 4 carbon atoms in the alkyl group, arylamido having up to 10 carbon atoms in the aryl group, or amino, containing up to two substitutents. Each amino substituent may be hydrogen, alkyl having up to 4 carbon atoms or aryl containing up to 10 carbon atoms. The two substituents, taken together, may be cycloalkyl containing from 4 to 7 carbon atoms.

These compounds are useful as bronchodilators and as smooth muscle relaxants. Of particular interest as bronchodilators are the compound 4-(6,7-dimethoxyquinolin-4-yl)-piperazine-1-carboxylic acid, isobutyl ester, and the compound 4 - (6,7-dimethoxyquinolin-4-yl)-piperazine-1-carboxylic acid, 2-methyl-2-hydroxypropyl ester.

Other compounds of this invention are those of the formulae:

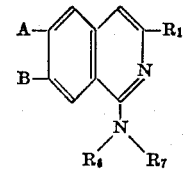

VII and

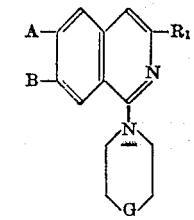

VIII and

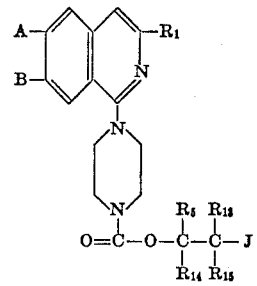

IX and their pharmaceutically-acceptable acid addition salts.

In the compounds of formulae VII, VIII and IX, A and B may each be alkoxy containing from 1 to 5 carbon atoms, hydrogen, hydroxy, or methyl. When A or B are hydrogen, the other is never hydrogen. A and B, taken together may be benzo or alkylenedioxy having up to 4 carbon atoms. $R_1$ is H or alkyl containing from 1 to 6 carbon atoms. $R_6$ and $R_7$ may each be H, alkyl or alkenyl containing up to 6 carbon atoms, aryl hydrocarbon containing up to 10 carbon atoms, aralkyl hydrocarbon containing up to 3 carbon atoms in the alkyl moiety and 7 carbon atoms in the aryl moiety, or β-hydroxyethyl. When $R_6$ and $R_7$ are aryl ar aralkyl, the aryl moiety may be substituted with up to 3 substituents which may be halogen or alkoxy containing up to 4 carbon atoms. $R_6$ and $R_7$, taken together, may be cycloalkyl containing from 3 to 7 carbon atoms.

G may be oxygen, sulfur, amino, alkylamino having up to 6 carbon atoms in the alkyl group, alkenylamino having from 3 to 6 carbon atoms in the alkenyl moiety, unsubstituted aryl hydrocarbon amino having up to 10 carbon atoms in the aryl moiety, acylamino having up to 6 carbon atoms in the acyl moiety, aroylamino having up to 11 carbon atoms in the aroyl moiety, carbalkoxyamino having up to 6 carbon atoms in the alkyl moiety, carbalkenyloxyamino having up to 6 carbon atoms in the alkenyl moiety or carbaryloxyamino having up to 10 carbon atoms in the aryl moiety. $R_5$, $R_{13}$, $R_{14}$ and $R_{15}$ may each be H, alkyl containing from 1 to 4 carbon atoms or hydroxymethyl. $R_5$ and $R_{13}$, taken together, may be cycloalkyl having from 4 to 7 carbon atoms.

J may be H, hydroxy, formyloxy, acyloxy containing from 2 to 5 carbon atoms, aroyloxy containing up to 11 carbon atoms, alkoxy containing from 1 to 4 carbon atoms, aryloxy containing up to 10 carbon atoms, chloro, bromo, formamido, alkylamino having up to 4 carbon atoms in the alkyl group, arylamido having up to 10 carbon atoms in the aryl group or amino, containing up to two substitutents. Each amino substituent may be hydrogen, alkyl having up to 4 carbon atoms or aryl containing up to 10 carbon atoms. The two substituents, taken together, may be cycloalkyl containing from 4 to 7 carbon atoms.

These compounds of formulae VII, VIII and IX are useful as bronchodilators and as smooth muscle relaxants. Particularly preferred as bronchodilators are the compound 4 - (6,7 - dimethoxyisoquinolin - 1 - yl) - piperazine - 1 - carboxylic acid, isobutyl ester, the compound 4-(6,7-dimethoxyisoquinolin-1-yl)-piperazine - 1 - carboxylic acid, ethyl ester, the compound 4-(6,7-dimethoxyisoquinolin-1-yl)-piperazine-1-carboxylic acid, 2-methyl-2-hydroxypropyl ester, and the compound 4-ethylamino-6,7-dimethoxyisoquinoline.

DETAILED DESCRIPTION OF THE INVENTION

This invention concerns the compounds of formulae I, II, III, IV, V, VA, VI, VII, VIII AND XI.

Compounds I, II and V may be prepared from the appriate substituted o-aminobenzoic acid amides. The amides are reacted with appropriate alkanoyl chlorides to form substituted o-alkaneamido benzoic acid amides which are then cyclized in alkaline ethanol to 2-alkyl-6,7-dialkoxy-4(3H)-quinazolinone. Where the 2-substituent is to be hydrogen, the substituted o-aminobenzoic acid amide may be cyclized by reacting it with formic acid. The 2-substituent on the resultant quinazoline is controlled by the nature of the alkanoyl chloride which is used. The 6- and 7-substituents on the resultant quinazoline are determined by the nature of the substituents on the original substitued o-aminobenzoic acid amide. The resultant quinazolinone is chlorinated to 2-alkyl-4-chloro-6,7-dialkoxyquinazoline using phosphorus oxychloride.

The 2-alkyl-4-chloro-6,7-dialkoxyquinazoline is aminated to the desired 2-alkyl-4-amino-6,7-dialkoxyquinazoline by reacting it with the appropriate amine or ammonia. The structure of the 4-substituent on the quinazoline is determined by the structure of the amine with which the 4-chloroquinazoline is reacted. The amination generally is carried out in an aqueous or organic solvent and, while ethanol is a preferred solvent, other polar solvents such as dimethylformamide, dioxane, tetrahydrofuran or methanol may be used. A molar excess of amine or base is generally employed. The reaction mixture is heated from 75 to 150° C. and from 1 to 13 hours under reflux conditions or in a pressure vessel. Preferred reaction times and temperatures are from 75 to 85° C. and from 2.5 to 3.5 hours for alkylamino or heterocyclic amino substituents and from 130 to 150° C. and from 11 to 13 hours where ammonia in ethanol is used.

The reaction sequences are shown for 4-(6,7-dimethoxyquinazoline-4-yl)-piperazine - 1 - carboxylic acid, isobutyl ester and for 2-propyl-4-amino-6,7-dimethoxyquinazoline.

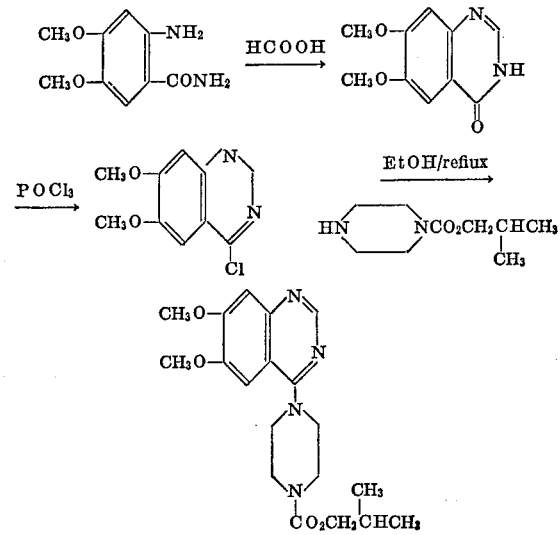

The reaction sequence for 2-propyl-4-amino-6,7-dimethoxyquinazoline is as follows:

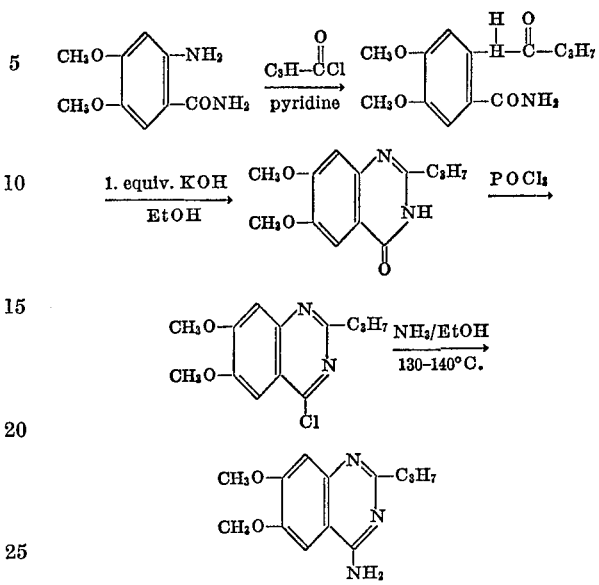

The substituents at the 6,7-position of the resulting quinazoline are controlled by the substituents on the original o-amino benzoic acid amide. Typical quinazolines, substituted at the 6- or 7-positions or both which are obtainable from substituted o-aminobenzoic acid amides by the cyclization procedure outlined herein are shown in Table I with their starting compounds.

TABLE I
Substituted quinazolines

| Starting compound: | Substituents |
|---|---|
| 4-methoxyanthranilamide | 7-methoxy- |
| 5-methoxyanthranilamide | 6-methoxy- |
| 6-aminoveratramide | 6,7-dimethoxy- |
| 4-ethoxyanthranilamide | 7-ethoxy- |
| 4,5-di-n-propyloxyanthranilamide | 6,7-di-n-propyloxy. |

The 2-alkyl-4-amino-6,7-substituted quinazolines of formulae I, II and V may also be prepared by use of the appropriate 2-alkyl-4-bromo-quinazolines, the appropriate 2-alkyl-4-alkoxy-quinazolines and the appropriate 2-alkyl-4-thioalkoxy-quinazolines in place of the 2-alkyl-4-chloro-quinazolines used in the procedures outlined above. When these compounds are used in place of the 4-chloro compounds, the reaction times and reaction conditions may differ from those given for the 4-chloro compounds. Those skilled in the art will easily be able to determine the appropriate reaction conditions where the 4-bromo, 4-alkoxy or 4-thioalkoxy compounds are used. The preferred reactants are the 4-bromo or 4-chloro quinazolines.

Compounds III, IV and VA can be prepared from 2,4-dichloro-6,7-dialkoxyquinazolines. These are prepared by the procedure given by F. H. S. Curd et al., J. Chem. Soc. (London), 1759 (1948). Where the 2-amino group is unsubstituted, (R₂, R₃ are hydrogen) an alternative method of preparation for Compound III may be used which involves the cyclization of the substituted 2-acrylanilines with cyanamide.

Where Compounds III, IV and VA are to be prepared from 2,4-dichloro-6,7-dialkoxyquinazolines, the 4-chloro substituent is replaced by a diester moiety which is decarboxylated to the desired alkyl substitutent at the 4-position. The nature of the 4-alkyl substituent is controlled by the ester which is used to replace the 4-chloro group. The replacement reaction, which utilizes the appropriate diethyl α-alkylmalonate, is accomplished in a solution of sodium hydride dissolved in dimethylformamide. Diethyl α-alkyl sodium malonate is formed and reacts at the 4-position to replace the 4-chloro substituent on the quinazoline. The reaction may be carried out at temperatures from 40 to 100° C. and over a period from about 1 to about 60 hours. A preferred temperature range is from 50 to 70° C. and a preferred range of reaction duration is from 35 to 45 hours at these temperatures. Yields of desired product range from 40 to 80 percent and 60 percent is typical. The diethyl 4-(2-chloro-6,7-dialkoxyquinazoline)-α-alkyl malonate is decarboxylated to 2-chloro-4-alkyl-6,7-dialkoxyquinazoline using sodium hydroxide or another suitable alkaline agent.

The 2-chloro position is aminated using ammonia or the appropriate amine dissolved in ethanol or another solvent. Suitable solvents include dimethylformamide, tetrahydrofuran and methanol. Where ethanol is used the reaction temperature may be from 100 to 150° C. and 125°–135° C. is a preferred temperature range. Typical yields are from 40 to 60 percent. The structure of the 2-amino substituent is completely determined by the nature of the amine which is used.

Compounds III, IV and VA may also be prepared from the appropriate 2,4-dibromo-6,7-substituted quinazolines, the appropriate 2,4-dialkoxy-quinazolines and the appropriate 2,4-dithioalkoxy-quinazolines. When these compounds are used in place of the 2,4-dichloro-quinazolines, the reaction times and reaction conditions may differ from those given for the 2,4-dichloro compounds. Those skilled in the art will easily be able to determine the appropriate reaction conditions where the 2,4-dibromo, the 2,4-dialkoxy or the 2,4-dithioalkoxy quinazolines are used in place of the 2,4-dichloro quinazolines. The use of the 2,4-dichloro quinazolines is the preferred synthesis route.

The hydrochloride salt of the resultant 2-amino-4-alkyl-6,7-dialkoxyquinazoline may be prepared by dissolving the quinazoline in ethanol or a mixture of ethanol and ethyl ether and passing hydrogen chloride gas through the solution for a sufficient period. The hydrochloride salt is thus formed.

Where Compound III is to be prepared from the appropriate 2-acylanilines the 2-substituent on the resulting quinazoline is amino. The 2-acylaniline is reacted with cyanamide at a temperature of 50 to 75° C. for a period of from 0.5 to 2 hours. A preferable temperature range is 50 to 60° C. and a preferable reaction duration, over this temperature range, is 30 to 60 minutes.

The compounds of formula VI are prepared from the corresponding 4-chloro-6,7-substituted quinolines. These latter compounds are prepared by the method given by B. Riegel et al., J. Am. Chem. Soc., 68, 1264 (1946). The nature of the 6- and 7-substituents is determined by the original 3,4- disubstituted aniline which is used to prepare the 6,7-substituted quinoline. The nature of the 2-substituent is determined by the malonic ester which is used to cyclize the 3,4-disubstituted aniline.

The compounds of formula VI are prepared by reacting the 4-chloro-6,7-substituted quinoline with an appropriate piperazine-1-carboxylic acid ester. This reaction may be carried out in an appropriate aqueous or organic solvent and, while ethanol is a preferred solvent, other polar solvents such as dimethylformamide, dioxane, tetrahydrofuran or methanol may be used. A molar excess of the piperazine acid ester may be employed. The reaction mixture is heated at a temperature from 100° C. to 170° C. for a period ranging from one to sixteen hours. Preferred reaction times are from 1.5 to 2.5 hours and preferred temperatures range from 120° C. to 140° C., where ethanol is the solvent.

An alternative procedure may be used which involves the preparation of 4-piperazinyl quinoline, as an intermediate. The compounds of formula VI are prepared from the intermediate, as indicated below.

The appropriate 4-bromo quinolines, 4-alkoxy quinolines and 4-thioalkoxy quinolines may be used in place of the 4-chloro quinolines to prepare the compounds of formula VI. When these compounds are used, the reaction duration and conditions may slightly differ from those used when the 4-chloro quinolines are the starting compounds. Those skilled in the art will easily be able to determine the appropriate reaction conditions for use where the 4-bromo, 4-alkoxy or 4-thioalkoxy quinolines are used as reactants. The preferred reactants are the 4-chloro quinolines.

Compounds VII, VIII and IX may be prepared from the appropriate 1-chloro-6,7-substituted isoquinolines. These latter compounds may be prepared by a method derived from that given by E. L. Anderson et al., J. Am. Pharm. Assoc., Sci. Ed., 41, 643 (1952).

The preparation method involves the reaction of a substituted phenethylamine with ethyl chloroformate, in benzene, to form the substituted phenethyl carbamic acid, ethyl ester. This latter compound is cyclized by treatment with polyphosphoric acid at about 140° C. for 30 minutes to form the 3,4-dihydro-1(2H)-isoquinolinone which is converted to the 1(2H)-isoquinolinone by use of a palladium on carbon catalyst. This reaction is continued until hydrogen evolution ceases. The 1(2H)-isoquinolinone is converted to the 1-chloro-isoquinoline by reaction with phosphorus oxychloride. The 1-chloroisoquinoline is reacted with the appropriate amine to form the compounds of formulae VII, VIII, and IX.

A typical reaction scheme may be shown as:

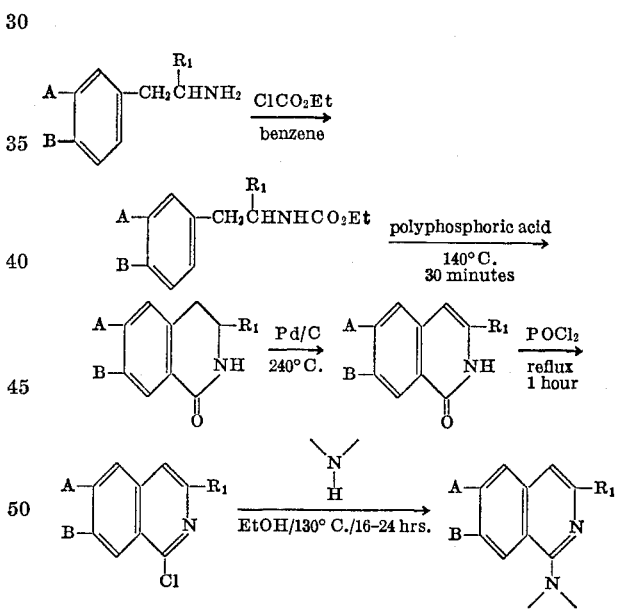

As is apparent from the reaction scheme set ourt above, the substituents at the 3-, 6- and 7-positions ($R_1$, A and B) are determined by the nature of the original substituted phenethylamine and the amino substituent at the 1-position is determined by the amine used in the final reaction step. In the compounds of formula IX, where the substituents $R_5$, $R_{13}$, $R_{14}$, $R_{15}$ and J are complex, it may be necessary or preferable to form the final compound in two or more steps, from the 1-chloro compound, as is outlined below.

The amination of the 1-chloro isoquinoline is generally carried out in an aqueous or organic solvent and, while ethanol is preferred as a solvent, other polar solvents such as dimethylformamide, dioxane, tetrahydrofuran or methanol may be used. A molar excess of amine or base may be used advantageously. The amination reaction takes place at a temperature ranging from 100° C. to 200° C. and a reaction duration of 10 to 36 hours. Preferred reaction temperatures are 120° C. to 140° C. and preferred reaction times range from 16 to 24 hours when ethanol is used as a solvent.

The compounds of formulae VII, VIII and IX may also be produced using the appropriate 1-bromo isoquinoline, the 1-alkoxy isoquinoline or the 1-thioalkoxy isoquinoline in place of the preferred 1-chloro compound. Where these compounds are used in place of the 1-chloro isoquinolines, the reaction conditions may differ from those given above for the 1-chloro compound. Those skilled in the art will easily be able to determine appropriate reaction temperatures and durations for producing the compounds of formulae VII, VIII and IX from the 1-bromo, 1-alkoxy or 1-thioalkoxy isoquinolines.

The methods used to prepare the compounds of formula VII (VIII and IX may also be used to prepare compounds of the following formula X:

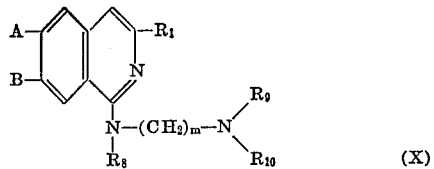

where A, B and $R_1$ are as defined for the compounds of formulae VII, VIII and IX and $R_8$, $R_9$ and $R_{10}$ are each H or alkyl having up to 6 carbon atoms. The number of methylene groups, $m$, is from 2 to 5. These compounds are useful as intermediates in preparing the compounds of formulae VII, VIII and IX.

Where compounds of formulae II, IV, V, VA, VI and IX are produced it is often preferable to prepare the final compound form the chloro derivative in two or more steps.

Nevertheless, the final compound may, in some cases, be more easily prepared in a single step by direct amination of the chloro derivative. Thus, the 4-(2-alkyl-6,7-dimethoxyquinazolin-4-yl)-piperazine-1 - carboxylic acid, isobutyl esters are prepared, directly, by reacting the 2-alkyl-4-chloro-6,7-dimethoxyquinazolines with piperazine-1-carboxylic acid, isobutyl ester. Similarly, the 4-(6,7-dimethoxyquinolin-4-yl)-piperazine-1-carboxylic acid, isobutyl ester is prepared, directly, by reacting 4-chloro-6,7-dimethoxyquinoline with the appropriate ester.

Suitable amino compounds, useful for producing the compounds of this invention, in one or more steps, from the chloro derivatives may be prepared by the following scheme:

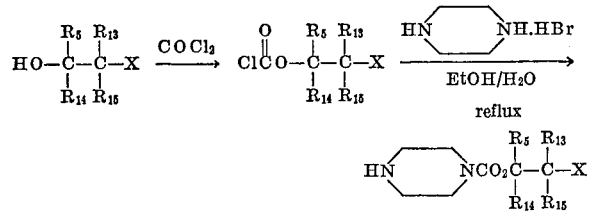

In these reaction X is chloro or bromo. The last compound is reacted directly with the 4-chloro quinazoline, the 4-chloro-quinoline or the 1-chloro-iso-quinoline to form the compounds of this invention where J is chloro or bromo.

The compound where J is chloro or bromo may then be converted to the corresponding compound, where J is hydroxyl, by treatment with 0.1 N hydrochloric acid. The compound where J is hydroxyl may then be converted to the compounds where J is acyloxy or aroyloxy by use of the appropriate acid chloride.

The compounds of formulae II, IV, V, VA, VI, and IX may also be prepared in several stages, analogously to the scheme shown below:

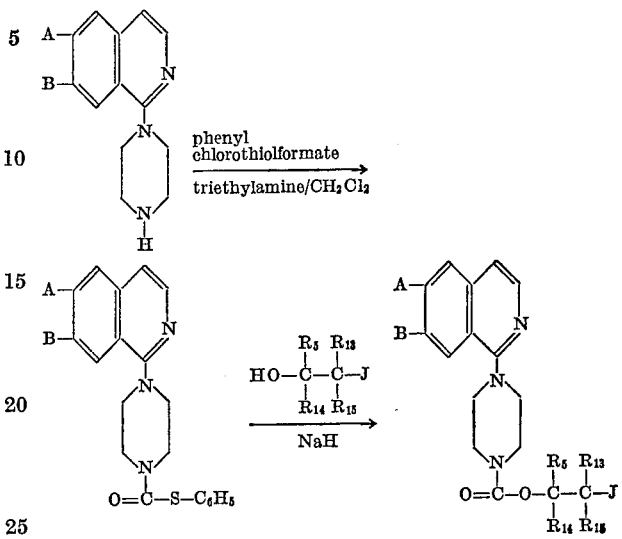

Compounds where J is alkylamido, arylamido or formamido may be produced from compounds where J is unsubstituted amino by treatment of the latter compounds with the appropriate acid chloride.

Variations of these procedures which also may be used to prepare the compounds of this invention from other similar compounds and by other methods will be obvious to those skilled in the art.

The well-known procedures for preparing salts of basic compounds are also applicable to the preparation of the compounds of this invention and are illustrated in the examples below. Such salts may be formed with both pharmaceutically-acceptable and pharmaceutically-unacceptable acids. By "pharmaceutically-acceptable" is meant those salt-forming acids which do not substantially increase the toxicity of the basic compound. The preferred salts, which are of particular value in therapy, are the acid addition salts. These include salts of mineral acids such as hydrochloric, hydriodic, hydrobromic, phosphoric, metaphosphoric, and sulfuric acids, as well as salts of organic acids such as tartaric, acetic, citric, malic, maleic, methanesulfonic, ethanesulfonic, benzenesulfonic, para-toluenesulfonic and gluconic as well as other suitable acids.

The pharmaceutically-unacceptable acid addition salts, while not useful for therapy, are valuable for use in the isolation and purification of these newly discovered compounds. Furthermore, they are useful for the preparation of the therapeutically valuable pharmaceutically-acceptable salts. Of this group, the more common salts include those formed with hydrofluoric and perchloric acids. Hydrofluoride salts are particularly useful for the preparation of the pharmaceutically-acceptable salts.

The compounds of this invention may be administered to hypertensive subjects or subjects suffering from bronchoconstriction in order to alleviate these conditions. The bronchoconstriction may be functional or may be caused by allergenic conditions or asthmatic conditions or may have come about as the result of a microbial infection. The compounds of this invention may be administered alone or in combinations with pharmaceutically-acceptable carriers. The proportion of the active ingredient to carrier is determined by the solubility and chemical nature of the therapeutic compounds, the chosen route of administration and the needs of the standard pharmaceutical practice. For example, where these compounds are administered in tablet form, excipients such as lactose, sodium citrate, calcium carbonate and dicalcium phosphate may be used. Various disintegrants such as starch, alginic acids, and certain complex silicates, together with lubricating agents such as magnesium stearate, sodium lauryl sulphate and talc, may also be used in producing tablets for the oral administration of these compounds. For oral administration in capsule form, lactose and high molecular weight polyethylene glycols are preferred materials for use as pharmaceutically-acceptable carriers. Where aqueous suspensions are to be used for oral administration, the compounds of this invention may be combined with emulsifying or suspending agents. Diluents such as ethanol, propylene glycol, glycerine and their combinations may be employed as well as other materials. Solutions of the compounds of this invention in combination with other solutes such as glucose or saline may be used where the compounds are to be administered parenterally. Such aqueous solutions should be suitably buffered, if necessary, to render them isotonic.

The compounds of this invention may be administered to subjects suffering from bronchoconstriction by means of inhalators or other devices which permit the active compounds to come into direct contact with the constricted areas of the tissues of the subject.

The dosage required to reduce the blood pressure of hypertensive subjects and to relieve the bronchoconstriction in affected subjects will be determined by the nature and the extent of the hypertension or bronchoconstriction. Generally, small dosages will be administered initially with gradual increase in dosage until the optimal dosage level is determined for the particular subject under treatment. It will generally be found that when the composition is administered orally, larger quantities of the active ingredient will be required in order to produce the same level of blood pressure reduction or bronchoconstriction relief as would be produced by the smaller quantity of active compound which is administered parenterally. In general, dosages will be in the range from about 0.02 to 200 milligrams of active ingredient per kilogram of body weight of subject, administered in single or multiple dosage units. Dosages at this level will effectively reduce blood pressure in hypertensive subjects and relieve bronchoconstriction in subjects suffering therefrom. Tablets containing 0.1 to 50 milligrams of active ingredient are found to be particularly useful.

The therapeutic effects of the compounds of this invention have been evaluated in Guinea pigs and dogs. It was found that the compounds manifested therapeutic action over extended periods of time, were easily absorbed into the treated subjects upon administration and showed relatively small effects on the central nervous systems of the treated subjects. Interestingly, the compound 4-(6,7-dimethoxyquinazolin-4-yl)-piperazine-1-carboxylic acid, 2-methyl-2-hydroxypropyl ester is found in the urine of dogs to which the compound 4-(6,7-dimethoxyquinazolin-4-yl)-piperazine-1-carboxylic acid, isobutyl ester has been administered. The former compound, wherein J is hydroxy, appears to be a metabolite of the latter compound, where J is hydrogen. The effectiveness of the compounds of this invention as therapeutic agents was measured with respect to theophylline, a known bronchodilator and with respect to known hypotensive agents.

The compounds of this invention also have been observed to inhibit the activity of the enzyme phosphodiesterase, which catalyzes the conversion of adenosine-3',5'-monophosphate (3',5'-AMP) to adenosine-5'-monophosphate (5'-AMP). Thus, in systems containing phosphodiesterase in which it is desirable to maintain a high 3',5'-AMP level, the instance compounds might be used to great advantage. The ability of the novel compounds to inhibit the enzyme activity is of significance since it is well known that the mononucleotide 3',5'-AMP is an important regulator of numerous cellular and tissue processes, e.g. smooth muscle relaxation, lipolysis and glycolysis. The instant compounds are tissue-specific inhibitors of the enzyme, i.e., they will inhibit the enzyme in certain tissues and not in others; therefore, when it is desirable to raise the 3',5'- AMP level in only one of several types of tissues which are present, use of the instant compounds is particularly advantageous.

This phosphodiesterase inhibition is also significant for the relaxation of bronchial and peripheral vascular smooth muscle. Many of the novel compounds have been evaluated with respect to their ability to inhibit phosphodiesterase activity with a view to their potential activity as bronchodilators, smooth muscle relaxants or anti-hypertensives.

It will be understood that various changes in the details, materials and steps which have been herein described and illustrated in order to explain the nature of this invention may be made by those skilled in the art within the principle scope of the invention.

The following examples are given by way of illustration only and are not to be construed as limiting the scope of this invention in any way.

EXAMPLE I

Preparation of 4-piperazinyl-6,7-dimethoxyquinaxoline

A solution of 20.5 grams (0.09 mole) of 4-chloro-6,7-dimethoxyquinazoline dissolved in 1 liter of chloroform was added, dropwise, over a 24 hour period, to a stirred, refluxing solution of 77.4 grams (0.9 mole) of anhydrous piperazine dissolved in 1 liter of absolute ethanol. The resultant solution was evaporated to a crystalline residue which was dissolved in 600 ml. of water. The aqueous solution was extracted with four 200 ml. portions of methylene chloride and the combined extracts were dried over sodium sulfate. Evaporation of the solvent afforded 23.7 grams of a crystalline residue which melted at 143–147° C. The residue was recrystallized from 150 ml. of ethyl acetate to separate 18.2 grams of white rods, with a melting point of 147–148° C., which were homogenous by thin layer chromatography. Further recrystallization from ethyl acetate provided an analytical sample, as white rods, which melted at 150–151.5° C. The procedure afforded a yield of 74 percent.

Analysis.—Calcd. for $C_{14}H_{18}N_4O_2$: C, 61.29; H, 6.61; N, 20.43. Found: C, 61.24; H, 6.40; N, 20.26.

EXAMPLE II

Preparation of 4-(6,7-dimethoxyquinazolin-4-yl)-piperazine-1-carboxylic acid, 2-methyl-2-chloropropyl ester To a cold (0° C.) solution of 2.74 g. (0.010 mole) of 4-piperazinyl-6,7-dimethoxyquinazoline, prepared by the method of Example I, and 1.10 g. (0.010 mole) of triethylamine in 40 ml. of methylene chloride was added a solution of 1.7 g. (0.010 mole), of 2-methyl-2-chloropropyl chloroformate in 20 ml. of methylene chloride dropwise, over 10 minutes. After warming to room temperature, the cloudy mixture was diluted with 50 ml. of methylene chloride, washed with 50 ml. of water and dried over sodium sulfate. Evaporation of the solvent left 4.3 g. of white crystalline solid, M.P. 140–146° C. Recrystallization from acetone-water mixture produced 2.6 g. (63.5%) of the analytical sample as a white crystalline solid, M.P. 158–159° C.

Analysis.—Calcd. for $C_{19}H_{25}O_4N_4Cl$: C, 55.80; H, 6.19; N, 13.70; Cl, 8.67. Found: C, 55.50; H, 6.15; N, 13.77; Cl, 8.59.

EXAMPLE III

Preparation of 4-(6,7-dimethoxyquinazolin-4-yl)-piperazine-1-carboxylic acid, 2-methyl-2-hydroxypropyl ester A solution of 6.0 g. (0.0147 mole) of crude 4-(6,7-dimethoxyquinazolin-4-yl)-piperazine-1-carboxylic acid, 2-methyl-2-chloropropyl ester in 225 ml. of 0.1 N hydrochloric acid was allowed to reflux for 1 hour. The cooled solution was extracted with three 100 ml. portions of methylene chlorine, and the aqueous phase subsequently made basic with dilute sodium hydroxide solution and extracted with three 100 ml. portions of methylene chloride. These latter organic extracts were combined, dried over sodium sulfate and evaporated and the resulting residue recrystallized from a chloroform-ethyl acetate mixture to separate 2.1 g. (37%) of white prisms, M.P. 199–200° C.

*Analysis.*—Calcd. for $C_{19}H_{26}O_5N_4$: C, 58.45; H, 6.71; N, 14.35. Found: C, 58.36; H, 6.63; N, 14.62.

EXAMPLE IV

Preparation of 4 - (6,7 - dimethoxyquinazolin - 4 - yl)-piperazine - 1 - carboxylic acid, 2-methyl-2-propenyl ester, hydrochloride A mixture of 40.4 g. (0.18 mole) of 4-chloro-6,7-dimethoxyquinazoline, prepared by the method of Part B of Example V of U.S. Pat. 3,517,005, and 33.0 g. (0.18 mole) of piperazine-1-carboxylic acid, 2-methyl-2-propenyl ester in 400 ml. of ethanol was refluxed for 4 hours, and then evaporated to dryness to leave 73 g. (100%) of crystalline solid. This was dissolved in 600 ml. of water and extracted with four 500 ml. portions of methylene chloride. The combined extracts were evaporated to a volume of 500 ml. and ethyl acetate added until crystallization began. Filtration separated 48.0 g. (65%) of the hydrochloride salt of the product as a pale yellow microcrystalline solid, M.P. 212–213° C. (dec.).

A second crop (6.2 g., 8.4%) of product as a yellow microcrystalline solid, M.P. 210–213° C. (dec.) was obtained by concentration of the filtrate. This material was homogenous by thin layer chromatography.

EXAMPLE V

Preparation of 4-(6,7-dimethoxyquinazolin-4-yl)-piperazine-1-carboxylic acid, 2-methyl-2-hydroxypropyl ester To 200 ml. of 50% sulfuric acid-water mixture was added 25 g. (0.0615 mole) of 4-(6,7-dimethoxyquinazolin-4-yl)-piperazine-1-carboxylic acid, 2-methyl-2-propenyl ester, hydrochloride. The resulting yellow solution was stirred at room temperature for 1 hour, poured into 200 g. of ice and made basic with 40% sodium hydroxide solution, keeping the temperature below 40° C. The resulting solution was extracted with four 200 ml. portions of methylene chloride, and the combined organic extracts were extracted with 0.5 N hydrochloric acid and finally with three 100 ml. portions of water. The combined aqueous extracts were made basic with 40% sodium hydroxide solution and extracted with three 200 ml. portions of methylene chloride. The latter methylene chloride extracts were combined, dried over sodium sulfate and evaporated to leave 18.0 g. (75%) of crystalline solid, M.P. 192–195° C. This was recrystallized from chloroform-ethyl acetate mixture to separate 14.5 g. (80%) of analytically pure product, M.P. 198–199.5° C.

EXAMPLE VI

Five parts, by weight, of the 4-(6,7-dimethoxyquinazolin-4-yl)-piperazine-1-carboxylic acid, 2-methyl-2-hydroxypropyl ester is dissolved in pyridine at 0° C. and an excess of propionyl chloride is added, dropwise. At the completion of the addition, the resulting mixture is refluxed for 1 hour, cooled, diluted with water and extracted three times with methylene chloride. After washing, the combined methylene chloride layers with dilute acid, they are dried and evaporated to dryness to give 4 - (6,7 - dimethoxyquinazolin-4-yl)-piperazine-1-carboxylic acid, 2-methyl-2-propionoxypropyl ester which is purified by recrystallization if necessary.

In a similar manner, the 2-methyl-2-butyryloxypropyl ester, the 2-methyl-2-naphthoyloxypropyl ester, the 2-methyl-2-benzoxypropyl ester and the 2-methyl-2-acetoxypropyl ester are prepared.

EXAMPLE VII

Preparation of 4-(6,7-dimethoxyquinazolin-4-yl)-piperazine-1-carboxylic acid, 2-dimethylaminoethyl ester Part. A.—Preparation of 4-(6,7-dimethoxyquinazolin-4-yl)-piperazine-1-thiol carboxylic acid, phenyl ester: To a cold (0°) solution of 20.0 g. (0.073 mole) of 4-piperazinyl-6,7-dimethoxyquinazoline, prepared by the methods of Example I, and 8.05 g. (0.084 mole) of triethylamine in 150 ml. of methylene chloride was added, dropwise, 12.9 g. (0.075 mole) of phenyl chlorothiolformate. The resulting mixture was allowed to stir at room temperature for 15 minutes and 100 ml. of methylene chloride was added. This solution was washed with two 50 ml. portions of water, dried over sodium sulfate and evaporated to separate 27.46 g. of crude product, M.P. 146–151° C. Recrystallization from 500 ml. of methanol separated 15.84 g. (53%) of product as a pale yellow microcrystalline solid, M.P. 170–173° C. An additional 5.59 g. (19%), M.P. 166–170° C., of product was obtained from further concentration of the mother liquor.

Part B.—Preparation of 4-(6,7-dimethoxyquinazolin-4-yl)-piperazine-1-carboxylic acid, 2 - dimethylaminoethyl ester: To a suspension of 1.60 g. (0.044 mole) of sodium hydride (60% mineral oil dispersion) in 50 ml. of tetrahydrofuran was added 3.92 g. (0.044 mole) of 2-dimethylaminoethanol and the solution refluxed until gas evolution ceased (45 minutes). The resulting solution was cooled to room temperature and a solution of 4.1 g. (0.01 mole) of 4 - (6,7 - dimethoxyquinazolin-4-yl)-piperazine-1-thiol carboxylic acid, phenyl ester in 15 ml. of tetrahydrofuran was added at once and the solution stirred at room temperature for 45 minutes. After dilution with 50 ml. of water, the solution was concentrated to remove the tetrahydrofuran, and extracted with four 50 ml. portions of methylene chloride. The combined extracts were dried over sodium sulfate and evaporated to separate 4.39 g. of crude product, M.P. 110–114° C. Recrystallization from ethylacetatehexane mixture gave 2.52 g. (65%) of product as an off-white microcrystalline solid, M.P. 100–104° C.

The corresponding hydrochloride evidenced a melting point of 230–232° C.

In a similar manner, the compound 4-(6,7-dimethoxyquinazolin-4-yl)-piperazine-1-carboxylic acid, 2-diethylaminoethyl ester was prepared, M.P. 90–93° C.; recrystallized from isopropyl ether; M.P. of hydrochloride 151° C.

EXAMPLE VIII

When the procedures of Example VII are employed, using the appropriate aminoalkanol or aminocarbinol in the procedure of Part B of Example VII and the product of Part A of Example VII, the 4-(6,7-dimethoxyquinazolin-4-yl)-1-carboxylic acid, 2-methyl - 2 - ethylmethylaminopropyl ester, the 2-methyl-2-aminopropyl ester, the 2-methyl-2-anilinopropyl ester, the 2-methyl-2-butylaminopropyl ester, the 2-methyl-2-m-tolylaminopropyl ester, the 2-methyl-2-naphthylaminopropyl ester, the 2-methyl-2-pyrrolidinylpropyl ester, the 2-methyl-2-piperidinylpropyl ester and the 2-methyl-2-homopiperidinylpropyl ester are produced.

When the procedures of Example VII are employed, using the appropriate 2-alkoxycarbinol, 2-alkoxyalkanol, 2-aryloxycarbinol or 2-aryloxyalkanol in place of the 2-dimethylaminoethanol of Part B of Example VII together with the product of Part A of Example VII, the 4-(6,7-dimethoxyquinazolin-4-yl)-piperazine-1-carboxylic acid, 2-methyl-2-propoxypropyl ester, the 2-methyl-2-isobutoxypropyl ester, the 2-methyl-2-phenoxypropyl ester, the 2-methyl-2-naphthoxypropyl esters, the 2-methyl-2-xyloylpropyl ester and the 2-methyl-2-methoxypropyl ester may be formed.

EXAMPLE IX

Five parts, by weight of 4-(6,7-dimethoxyquinazolin-4-yl)-piperazine-1-carboxylic acid, 2-methyl-2-aminopropyl ester, prepared by the method of Example VII, is dissolved in pyridine. To the solution is added, dropwise, at 0° C., a slight excess of propionyl chloride. After the addition is complete, the resultant mixture is heated at reflux. The cooled mixture is diluted with water and the product 4-(6,7-dimethoxyquinazolin-4-yl)-piperazine-1-carboxylic acid, 2-methyl-2-ethamidopropyl ester is removed by filtration or extraction of the aqueous solution with methylene chloride.

In a similar manner, the 2-methyl-2-formamidopropyl ester and the 2-methyl-2-butyramidopropyl ester are formed.

EXAMPLE X

Preparation of 4-(6,7-dimethoxyquinolin-4-yl)-piperazine-1-carboxylic acid, isobutyl ester A mixture of 3.4 g. (0.0152 mole) of 4-chloro-6,7-dimethoxyquinoline, prepared by the general methods given by B. Riegel et al., J. Am. Chem. Soc., 68, 1264 (1946), and 5.65 g. (0.031 mole) of piperazine-1-carboxylic acid, isobutyl ester in 80 ml. of ethanol was heated at 130° C. for 2 hours. The resulting solution was concentrated to dryness and the residue slurried in water and filtered to separate 6.1 g. of crude product. Recrystallization from 50 ml. of ethanol afforded 4.3 g. (76%) of an off-white crystalline product, M.P. 172–173° C.

*Analysis.*—Calcd. for $C_{20}H_{27}O_4N_3$: C, 64.32; H, 7.29; N, 11.25. Found: C, 64.13; H, 7.16; N, 11.36.

EXAMPLE XI

Preparation of 4-(6,7-dimethoxyquinolin-4-yl)-piperazine-1-carboxylic acid, 2-methyl-2-hydroxypropyl ester The methods used in Example V were used to prepare the 2-methyl-2-hydroxypropyl ester which evidenced a melting point of 172–173° C. and was recrystallized from ethyl acetate.

EXAMPLE XII

The methods of Examples II through XI inclusive are used to prepare compounds of the following formulae:

| A | B | $R_1$ | $R_{14}$ | J |
|---|---|---|---|---|
| $CH_3O$ | $C_3H_7O$ | $CH_3$ | $CH_2OH$ | OH |
| $CH_3O$ | $CH_3CHCH_2$ $\;\;\;\;\vert$ $CH_2$ $\;\;\;\;\vert$ $O$ | $C_3H_7$ | $CH_3$ | OH |
| $C_6H_{13}O$ | $CH_3O$ | Isobutyl | $C_2H_5$ | Cl |
| $CH_3$—CH—$CH_2$ $\;\;\;(CH_2)_3$ $\;\;\;\;\;\;\vert$ $\;\;\;\;\;\;O$ | $CH_3O$ | $C_6H_{13}$ | $CH_3$ | OH |
| OH | OH | $CH_3$ | H | OH |
| | Benzo | $CH_3$ | H | OH |
| $CH_3$ | $CH_3O$— | H | H | H |
| $CH_3$ | $CH_3$ | $CH_3$ | H | H |
| H | $CH_3O$ | H | H | Cl |
| | —O—$CH_2$—O— | H | H | Br |
| | —O—$(CH_2)_4$—O— | H | H | $CH_3$ |
| $CH_3O$ | H | H | Isobutyl | OH |

EXAMPLE XIII

The methods of Examples 11 through XI inclusive are used to prepare compounds of the following formula:

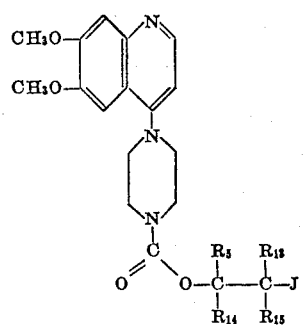

| $R_5$ | $R_{13}$ | $R_{14}$ | $R_{15}$ | J |
|---|---|---|---|---|
| $CH_3$ | H | $CH_3$ | H | H |
| $C_2H_5$ | H | H | $C_2H_5$ | OH |
| Isobutyl | H | H | H | Br |
| $CH_3$ | $CH_3$ | $C_2H_5$ | H | Cl |
| $CH_3$ | H | Isobutyl | H | $NH_2$ |
| $CH_2OH$ | H | H | Isobutyl | H |
| $CH_3$ | $C_3H_7$ | H | H | $-O-\overset{O}{\underset{\|}{C}}-\overset{CH_3}{\underset{CH_3}{\overset{\|}{CH}}}$ |
| H | H | H | H | $-O-\overset{O}{\underset{\|}{C}}-\text{naphthyl}$ |
| H | $CH_3$ | H | H | $-O-\overset{O}{\underset{\|}{C}}-\text{(CH}_3\text{-phenyl)}$ |
| H | H | H | H | $-O-\overset{O}{\underset{\|}{C}}-\text{(C}_3\text{H}_7\text{, CH}_3\text{-phenyl)}$ |
| —$(CH_2)_4$— | | H | $CH_3$ | $-O-\overset{O}{\underset{\|}{C}}-CH_3$ |
| —$(CH_2)_7$— | | $C_2H_5$ | H | $-O-\overset{O}{\underset{\|}{C}}-H$ |
| H | H | H | H | $-\overset{H}{\underset{\|}{N}}-\overset{O}{\underset{\|}{C}}-\text{phenyl}$ |
| H | H | $CH_3$ | H | $-\overset{H}{\underset{\|}{N}}-\overset{O}{\underset{\|}{C}}-\text{naphthyl}$ |
| $CH_3$ | H | H | H | $-\overset{H}{\underset{\|}{N}}-\overset{O}{\underset{\|}{C}}-\text{(CH}_3\text{, C}_3\text{H}_7\text{-phenyl)}$ |
| H | $CH_3$ | $CH_3$ | H | $-N(CH_3)_2$ |
| H | $C_2H_5$ | H | H | $-N(CH_3, C_2H_5, CH(CH_3))$ |

TABLE—Continued

| $R_5$ | $R_{13}$ | $R_{14}$ | $R_{15}$ | J |
|---|---|---|---|---|
| H | H | H | H | —NH-naphthyl |
| | H | H | H | —NH-(4-methylphenyl) |
| $CH_3$ | H | H | H | —N($CH_3$)-(4-propylphenyl) |
| H | H | H | H | —N(pentamethylene ring, piperidino) |
| H | H | $CH_3$ | H | —NH—$C_2H_5$ |
| H | H | H | $CH_3$ | —N(tetramethylene ring, pyrrolidino) |
| H | H | $CH_3$ | H | —NH—CHO |
| H | $CH_3$ | $CH_3$ | H | —O—$CH_3$ |
| H | H | H | $CH_3$ | —O—$C_2H_5$ |
| H | $CH_3$ | H | H | —O—CH($CH_3$)$C_2H_5$ |
| $CH_3$ | H | H | H | —O-phenyl |
| H | $CH_3$ | $C_2H_5$ | H | —O-naphthyl |
| H | H | H | H | —O-(3-methyl-4-propylphenyl) |
| H | H | H | H | —NH—CO—$CH_3$ |
| H | H | H | H | —NH—CO—$C_2H_5$ |
| H | $CH_3$ | H | H | —NH—CO—CH($CH_3$)$C_3H_5$ |
| $CH_3$ | H | H | H | —NH$_2$ |
| $CH_3$ | H | H | H | —NH-phenyl |
| H | H | H | H | —N(diphenyl, carbazole) |
| H | H | H | H | —N($CH_3$)-naphthyl |
| H | H | H | H | —N($CH_3$)-(3-methyl-5-propylphenyl) |

EXAMPLE XIV

Bronchodilator Activity

Conscious female guinea pigs, which had been fasted for 12 hours, received oral or parenteral dosages of the compound which was to be tested for effectiveness. Control animals received doses of saline solution which did not contain the compound which was under test. Subsequent to this administration, each animal was challenged with histamine aerosol.

The challenge procedure consisted of spraying a 0.4 percent aqueous solution of histamine, at a pressure of 5 lb./in.$^2$ into an 8 x 8 x 12 inch plastic container for one minute. Immediately after the container was subjected to the histamine spray the animal was placed within it. At the end of one minute of exposure, the respiratory status, which is a reflection of bronchoconstriction, was evaluated. Evaluation levels were designated and scored as normal breathing (0), slightly deepened breathing (1), labored breathing (2), severely labored breathing and ataxia (3) and unconsciousness (4). Each group of animals contained 8 to 10 individuals and a control group containing the same approximate number was used. The scores for the control group and the group which had been treated with the compound under test were compared and the difference was expressed as percent protection.

The doses, which were given orally, were 60 mg./kg. and the animals were challenged with histamine 60 minutes later. The standard compound used was theophylline which gave 25 percent protection after a dose of 60 mg./kg. was administered orally and the animal was challenged one hour later. When the compounds listed below were administered according to this procedure and the animals were challenged accordingly, the following percent protection was observed.

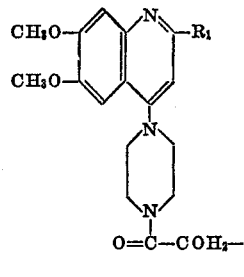

| $R_1$ | $R_{13}$ | $R_{15}$ | J | Percent protection |
|---|---|---|---|---|
| H | $CH_3$ | $CH_3$ | H | 24 |
| H | $CH_3$ | $CH_3$ | OH | 17 |

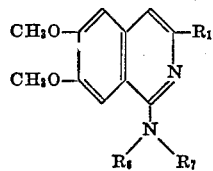

| R₁ | R₆ | R₇ | Percent protection |
|---|---|---|---|
| H | H | CH₂CH₃ | 14 |

$$\text{CH}_3\text{O}-\text{...}-R_1$$
$$\text{CH}_3\text{O}-\text{...}-N$$

structure with piperazine linked to $O=C-OCH-\underset{R_{15}}{\overset{R_{13}}{C}}-J$

| R₁ | R₁₃ | R₁₅ | J | Percent protection |
|---|---|---|---|---|
| H | H | H | H | 20 |
| H | CH₃ | CH₃ | H | 30 |
| H | CH₃ | CH₃ | OH | *62 |

*This compound shows 80% protection after 8 hours.

structure: 6,7-dimethoxyquinazoline with piperazine at 4-position, connected to $O=C-O-\underset{R_{14}}{\overset{R_5}{C}}-\underset{R_{15}}{\overset{R_{13}}{C}}-J$

| R₁ | R₅ | R₁₃ | R₁₄ | R₁₅ | J | Percent protection |
|---|---|---|---|---|---|---|
| H | H | CH₃ | H | CH₃ | H | 50 |
| H | H | CH₃ | H | CH₃ | OH | 50 |
| H | H | CH₃ | H | CH₃ | Cl | 43 |
| H | H | CH₃ | H | ------ | =CH₂ | 18 |
| H | H | H | H | H | N(CH₂CH₃)₂ | 9 |

EXAMPLE XV

Spirally cut strips of guinea pig trachea were prepared as described by J. W. Constantine, J. Pharm. Pharacol., 16, 384 (1965). Isometric relaxations were recorded using a force displacement transducer (Model FT-03, Grass Instrument Co., Quincy, Mass.) connected to a Grass Model 7 polygraph (Grass Instrument Co., of Quincy, Mass.).

The relative smooth muscle relaxing effects of each of the compounds tested were compared as follows:

(1) The muscle relaxant effect of a bathing medium of 0.03 μg./ml. of isoproterenol was determined for each strip and was shown to be supramaximal. This response was taken as the maximum relaxation of the strip.

(2) Subsequent relaxations of a given strip, to logarithmically-spaced concentrations of the compounds under test, were determined and were converted to percent of isoproterenol-induced relaxation. Curves of dosage vs. percent of maximum relaxation were obtained for each compound.

(3) The figure reported below for each compound was that concentration (expressed in μg./ml.) of compound which was needed to obtain 50% of maximum relaxation ($EC_{50}$) of the tracheal strip. Consequently, the smaller the $EC_{50}$ the more potent the compound was as a smooth muscle relaxant.

(4) Two standard compounds, theophylline (a known bronchodilator) and papaverine, were evaluated as well. The following compounds were tested with corresponding values of $EC_{50}$:

| | $EC_{50}$ |
|---|---|
| Theophylline | 6.4 |
| Papaverine | 0.3 |

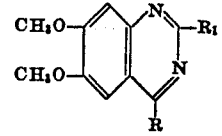

| R | R₁ | $EC_{50}$ |
|---|---|---|
| —NH₂ | H | 3.2 |
| —NHCH₃ | H | 1.8 |
| —NHCH(CH₃)₂ | H | 4.0 |
| —NH(CH₃)₂C₆H₅ | H | 0.4 |
| —N(CH₂CH₃)₂ | H | 0.78 |
| —NH—△ (cyclopropyl) | H | 1.9 |
| —N(CH₂CH₂CH₃)₂ | H | 0.4 |
| —N(CH₂CH=CH₂)₂ | H | 0.6 |
| —N(CH₂CH₂CH₂CH₃)₂ | H | 0.6 |
| —NH₂ | CH₃CH₂ | 0.5 |
| —N(azetidinyl with CH₂, (CH₃)₂, CH₂) | H | 0.5 |
| —N(piperidinyl) | H | 0.21 |
| —N(azepanyl) | H | 0.51 |
| —N(piperazinyl)—C(=O)—O—CH₂CH(CH₃)₂ | H | 1.0 |
| —N(piperazinyl)—C(=O)—OCH₂CH(CH₃)₂ | CH₃ | 0.7 |
| Same as above | CH₂CH₃ | 5.8 |
| Do. | —CH₂CH(CH₃)CH₃ | 5.8 |
| —N(piperazinyl)—C(=O)—OCH₂C(CH₃)₂—OH | H | 0.8 |
| —N(piperazinyl)—C(=O)—OCH₂C(CH₃)₂—Cl | H | 0.27 |

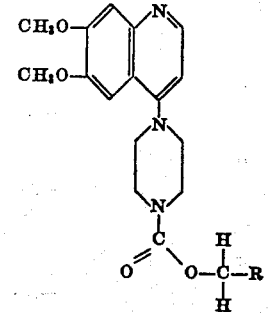

| R | $EC_{50}$ |
|---|---|
| —CH(CH₃)₂ | 0.7 |
| —CH₃ | 1.2 |
| —C(CH₃)₂OH | 0.8 |

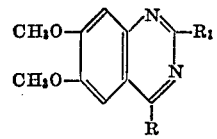

| R | EC$_{50}$ |
|---|---|
| —CH$_3$ | 0.25 |
| —CH(CH$_3$)$_2$ | 0.7 |
| —C(CH$_3$)$_2$OH (CH$_3$, CH$_3$, OH) | 0.25 |

EXAMPLE XVI

The compounds of this invention were evaluated with respect to their power to inhibit the action of cyclic 3',5'-nucleoside phosphodiesterase which can act to destroy 3',5' adenosine monophosphate.

The cyclic 3',5'-nucleoside phosphodiesterase was isolated using the procedure of R. W. Butcher and E. W. Sutherland, J. Biol. Chem., 237, 1244 (1962) and their purification procedure was carried through the third step given, namely through the ammonium sulfate fractionation, dialysis and freezing steps, but not through the chromatographic fractionation step.

For each compound tested, two substrates, containing each of the two control inhibitory compounds, and one substrate containing no inhibitory compound were prepared. Each substrate had a total volume of 2 ml., was $4 \times 10^{-4}$ molar in 3',5' adenosine monophosphate, contained 0.02 ml. of cyclic 3',5'-nuceoside phosphodiesterase and 4.0 μmoles of MgSO$_4$, 0.2 μmoles ethylene diamine tetraacetate and 80 μmoles of a suitable buffer which was to maintain the pH at 7.5. Where the substrate also contained a novel compound whose phosphodiesterase inhibitory power was to be tested or contained a control inhibitory compound, the compound was present at a concentration of $10^{-4}$ molar.

Two control compounds, papaverine and theophylline, a known bronchodilator, were run with each novel compound. Thus, at least four substrates, each containing 3',5' adenosine monophosphate, were run for each novel compound evaluated. One contained the novel compound, another contained theophylline, another contained papaverine and the last contained no phosphodiesterase inhibitor at all.

Each substrate was incubated for 30 minutes at 30° C. after which the reaction was stopped by boiling for 10 minutes. At this point one mg. of lyophilized Crotolus atrox venom dissolved in one ml. of pH 7.5 buffer was added and the new mixture was incubated for 30 minutes at 30° C. and this reaction was also stopped by boiling for 10 minutes. The venom reacts with 5'-adenosine monophosphate, a product of the reaction between phosphodiesterase and 3',5'-adenosine monophosphate, to release inorganic phosphate. Thus, a low final concentration of inorganic phosphate indicates that a small amount of 5'-adenosine monophosphate was formed and, therefore, that the phosphodiesterase activity was inhibited. The inorganic phosphorus was determined colorimetrically by the methods of C. H. Fiske and Y. Subbarow, J. Biol. Chem., 66, 375 (1925).

The percent inhibition was taken as the difference between the inorganic phosphate concentration in the substrate containing the inhibiting compound and the concentration in the substrate containing inhibitor divided by the concentration in the substrate without inhibitor.

The following compounds were tested:

| R | R$_1$ | Percent Inhibition | Theophylline, percent inhibition | Papaverine, percent inhibition |
|---|---|---|---|---|
| —NHCH(CH$_3$)$_2$ | H | 50 | 16 | 63 |
| —N(CH$_2$CH$_3$)$_2$ | H | 63 | 16 | 63 |
| —N(CH$_2$CH$_2$CH$_3$)$_2$ | H | 73 | 16 | 63 |
| —NHCH$_2$CH$_2$C$_6$H$_5$ | H | 58 | 16 | 63 |
| —NHCH$_3$ | H | 36 | 16 | 63 |
| —NH$_2$ | CH$_2$CH$_3$ | 45 | 17 | 71 |
| —N(CH$_2$CH=CH$_2$)$_2$ | H | 35 | 21 | 56 |
| —N(CH$_2$CH$_2$CH$_2$CH$_3$)$_2$ | H | 79 | 21 | 56 |
| —NH$_2$ | CH(CH$_3$)$_2$ | 26 | 19 | 71 |
| —NH$_2$ | C$_6$H$_5$ | 38 | 19 | 71 |
| —N(piperazinyl)-C(=O)-O-CH$_2$CH(CH$_3$)CH$_3$ | H | 30 | 16 | 63 |
| —N(piperazinyl)-C(=O)-OCH$_2$CH(CH$_3$)CH$_3$ | CH$_3$ | 35 | 27 | 43 |
| —N(piperazinyl)-C(=O)-O-CH$_2$CH(CH$_3$)CH$_3$ | CH$_2$CH$_3$ | 46 | 27 | 43 |
| —N(piperazinyl)-C(=O)-O-CH$_2$-CH(CH$_3$)CH$_3$ | CH(CH$_3$)$_2$ | 39 | 27 | 43 |
| —N(piperazinyl)-C(=O)-O-CH$_2$CH(CH$_3$)CH$_3$ | CH$_2$CH$_2$CH$_3$ | 51 | 27 | 43 |

TABLE—Continued

| R | $R_1$ | Percent inhibition | Theophylline, percent inhibition | Papaverine, percent inhibition |
|---|---|---|---|---|
| —NH₂ | CH₂CH₂C₆H₅ | 31 | 19 | 71 |
| 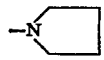 | H | 35 | 13 | 42 |
| 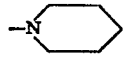 | H | 72 | 13 | 42 |
| 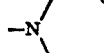 | H | 76 | 13 | 42 |
| 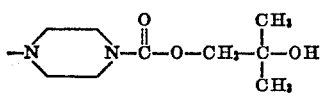 | H | 43 | 20 | 74 |

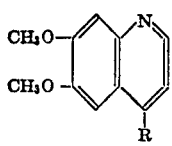

| R | Percent inhibition | Theophylline, percent inhibition | Papaverine, percent inhibition |
|---|---|---|---|
| 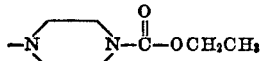 | 39 | 4 | 70 |
| 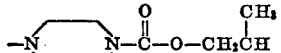 | 55 | 4 | 70 |
| 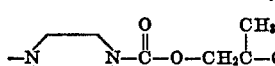 | 33 | 4 | 77 |

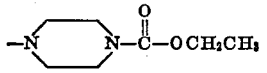

| R | Percent inhibition | Theophylline, percent inhibition | Papaverine, percent inhibition |
|---|---|---|---|
| 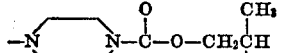 | 35 | 23 | 75 |
| 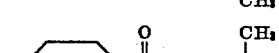 | 55 | 23 | 75 |
| (structure) | 38 | 18 | 76 |

What is claimed is:

1. A compound selected from the group consisting of those of the formula

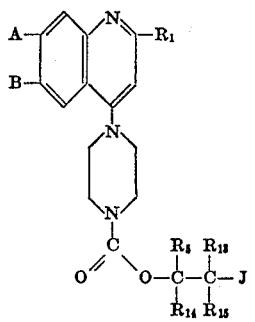

and the pharmaceutically-acceptable mono-acid addition salts thereof wherein A and B are each selected from the group consisting of methoxy, hydrogen, hydroxy and methyl with the proviso that when A or B is hydrogen, the other is never hydrogen; $R_1$, $R_5$, $R_{13}$, $R_{14}$ and $R_{15}$ are each selected from the group consisting of hydrogen and methyl and J is selected from the group consisting of hydrogen, hydroxy, alkoxy having from 1 to 4 carbon atoms, chloro, bromo, and amino having up to two substituents, each being selected from the group consisting of hydrogen and alkyl having up to 4 carbon atoms.

2. The compound of claim 1 wherein A and B are methoxy, $R_1$, $R_5$ and $R_{14}$ are hydrogen, $R_{13}$ and $R_{15}$ are methyl and J is hydrogen.

3. The compound of claim 1 wherein A and B are methoxy, $R_1$, $R_5$ and $R_{14}$ are hydrogen, $R_{13}$ and $R_{15}$ are methyl and J is hydroxy.

References Cited

UNITED STATES PATENTS 3,723,434   3/1973   Cronin et al. _____ 260—268 BQ

DONALD G. DAUS, Primary Examiner